United States Patent [19]
Takahashi et al.

[11] Patent Number: 5,867,278
[45] Date of Patent: Feb. 2, 1999

[54] IMAGE FORMING APPARATUS AND METHOD WHICH PROCESSES ORIGINALS FED BY A PLURALITY OF AUTOMATIC DOCUMENT FEEDING OPERATIONS AS A SERIES OF ORIGINALS

[75] Inventors: Toshiharu Takahashi; Miki Konno, both of Kawasaki; Masako Shibaki, Yokohama, all of Japan

[73] Assignee: Kabushiki Kaisha Toshiba, Kawasaki, Japan

[21] Appl. No.: 753,879

[22] Filed: Dec. 2, 1996

[30] Foreign Application Priority Data

Dec. 7, 1995 [JP] Japan ................................. 7-319111

[51] Int. Cl.$^6$ ................................................. G03G 15/00
[52] U.S. Cl. ........................... 358/296; 358/401; 399/85; 399/367
[58] Field of Search ............................... 399/367, 82, 85, 399/363; 358/401, 296, 403; 395/115, 116

[56] References Cited

U.S. PATENT DOCUMENTS

| | | | |
|---|---|---|---|
| 4,949,190 | 8/1990 | Thompson | 358/426 |
| 5,081,494 | 1/1992 | Reed et al. | 399/82 |
| 5,097,341 | 3/1992 | Forest | 358/296 |
| 5,097,979 | 3/1992 | Forest | 358/296 |
| 5,105,283 | 4/1992 | Forest et al. | 358/401 |
| 5,253,077 | 10/1993 | Hasegawa et al. | 358/401 X |
| 5,333,057 | 7/1994 | Morikawa et al. | 358/296 |
| 5,367,362 | 11/1994 | Forest | 399/43 |

FOREIGN PATENT DOCUMENTS

| | | |
|---|---|---|
| 0 478 356 A2 | 4/1992 | European Pat. Off. . |
| 0 727 903 A2 | 8/1996 | European Pat. Off. . |

*Primary Examiner*—Joan H. Pendegrass
*Attorney, Agent, or Firm*—Foley & Lardner

[57] ABSTRACT

An image forming apparatus including an ADF for automatically feeding a plurality of originals, a mechanism for selecting a continuous mode, in the continuous mode the plurality of originals separately fed by the ADF a plurality of number of times are processed as a series of originals, a mechanism for reading the images of the plurality of originals, a memory for storing as a series of images, the images read from the originals fed while the continuous mode is selected, and a printer for forming the series of images stored in the memory in a predetermined order.

4 Claims, 12 Drawing Sheets

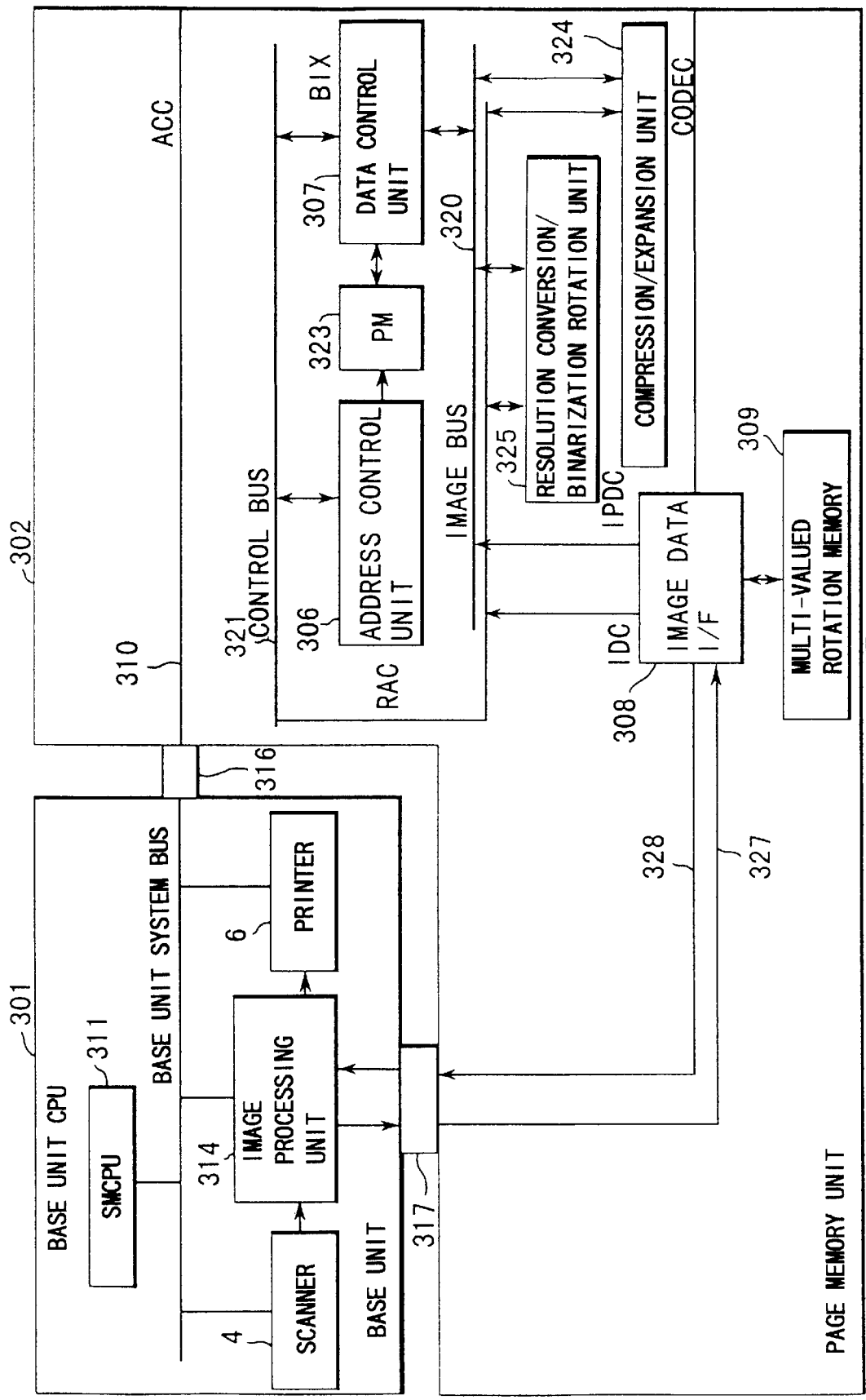
F I G. 5

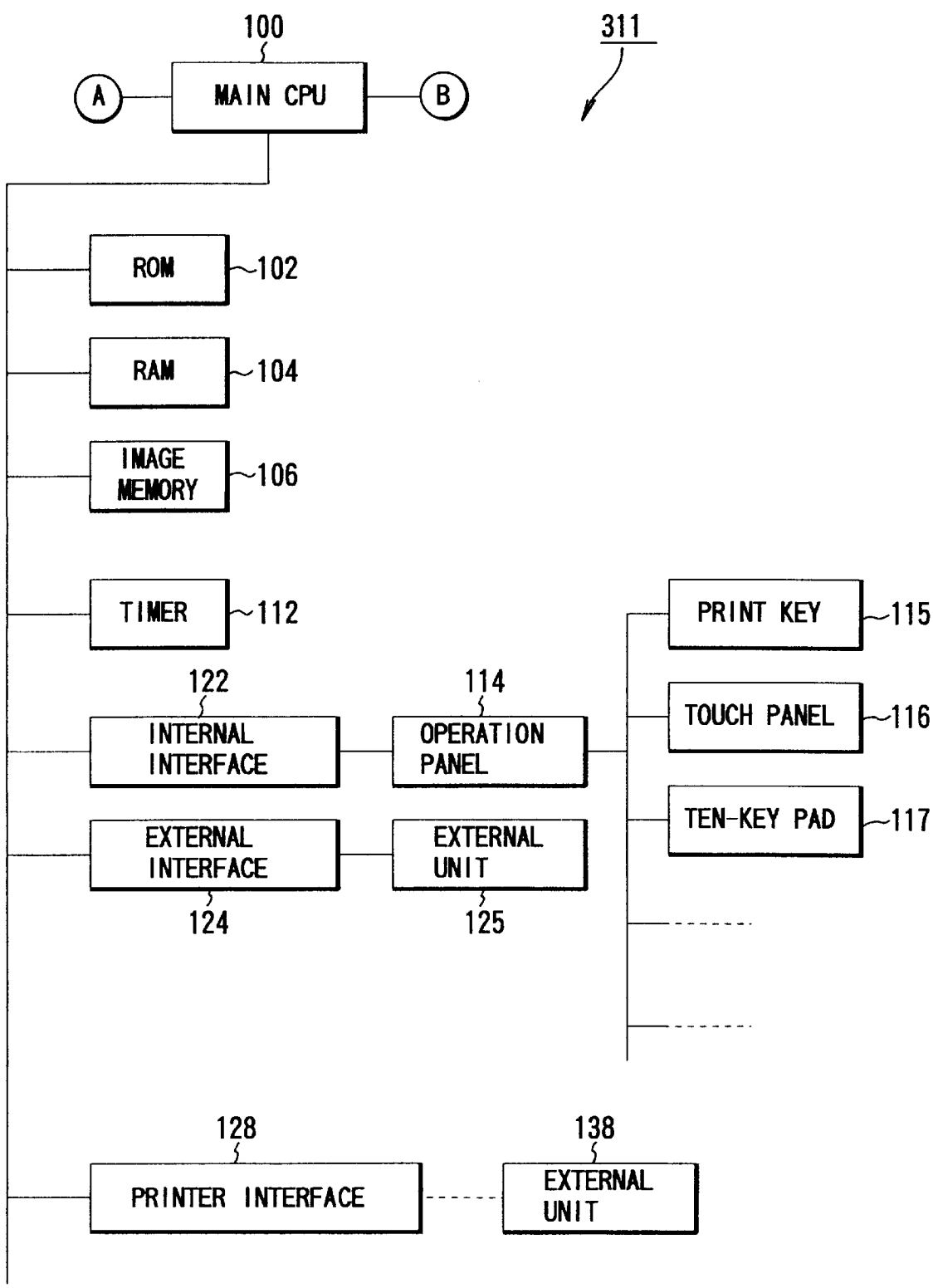
F I G. 7

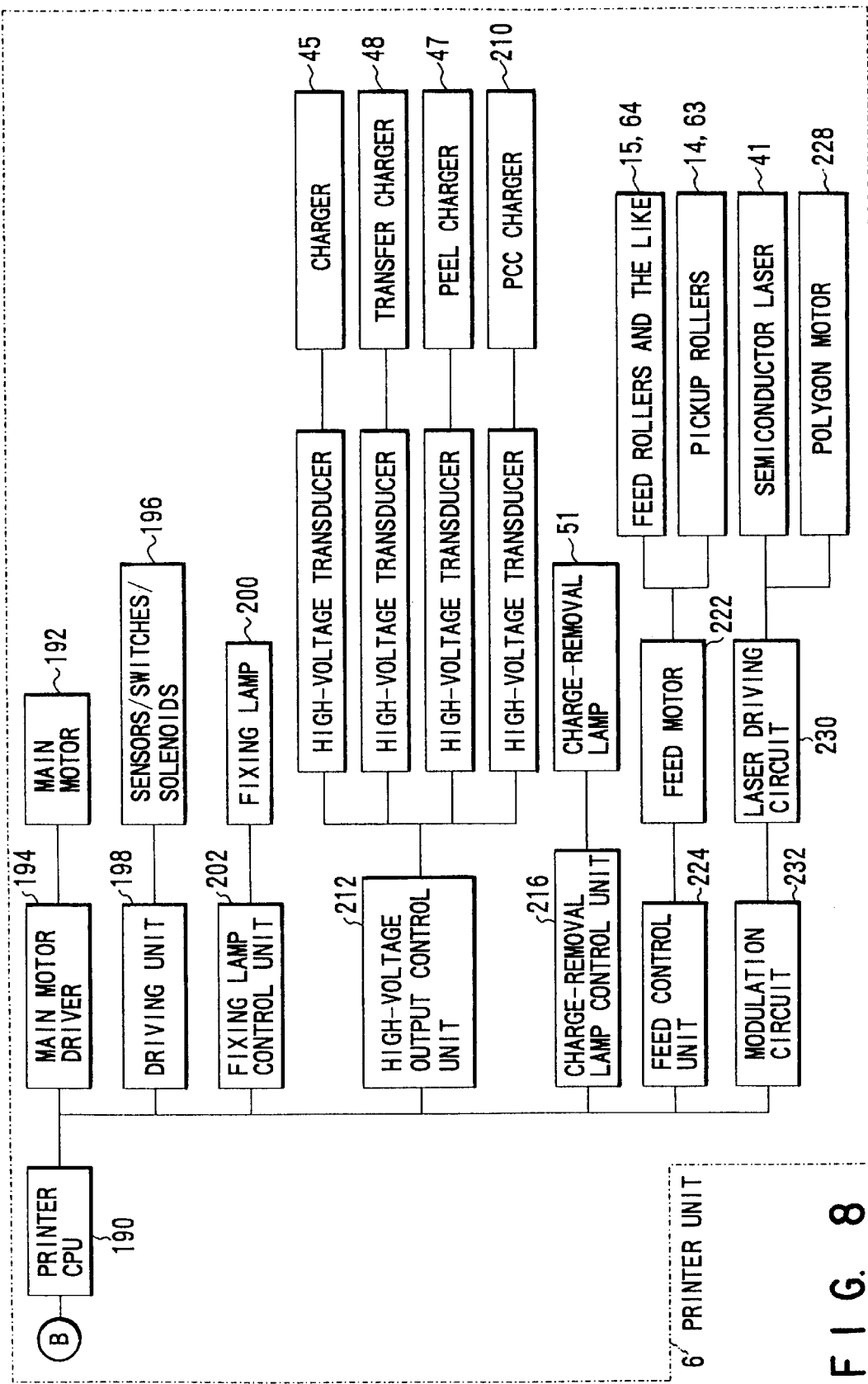
F I G. 8

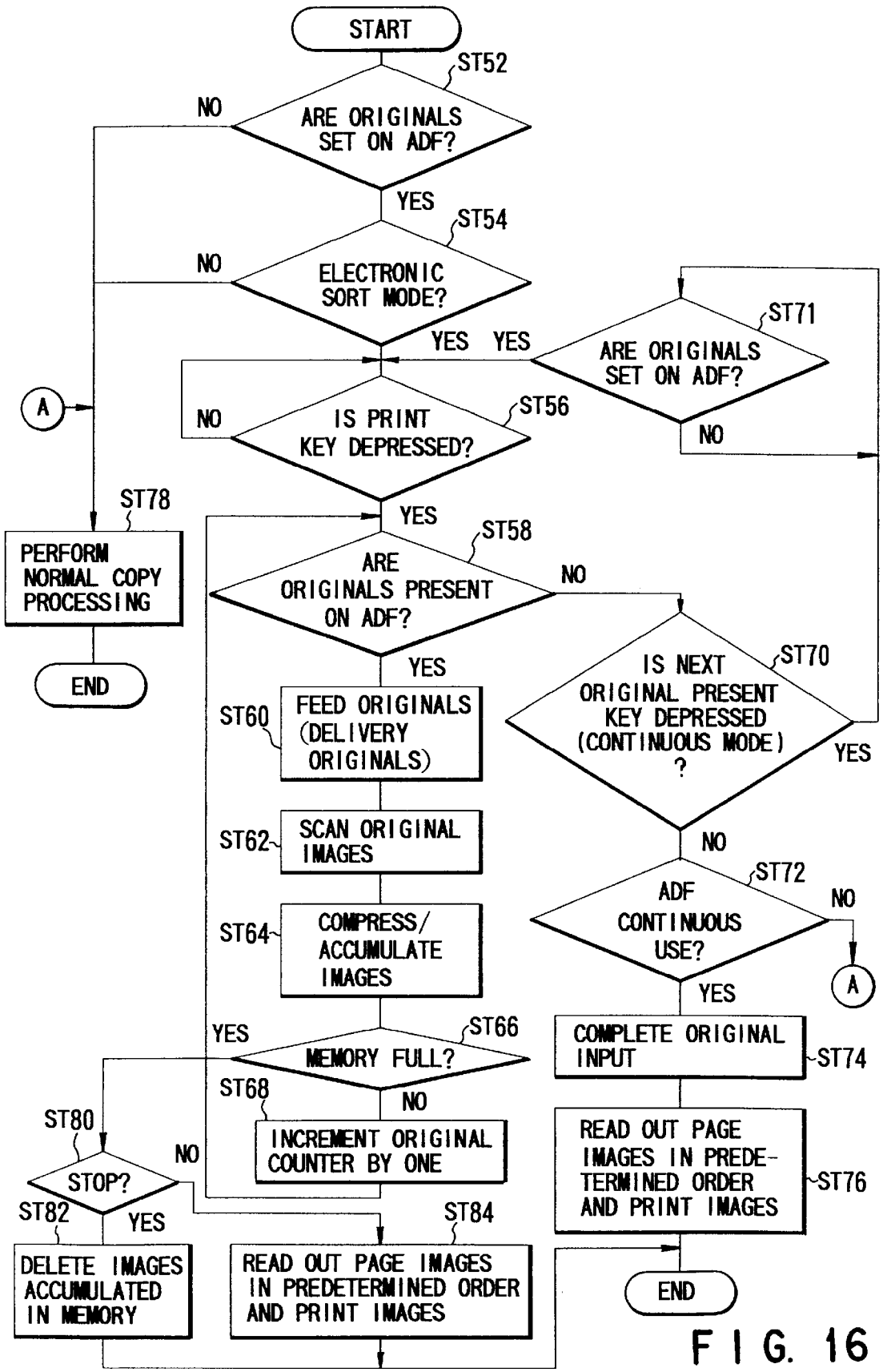
F I G. 16

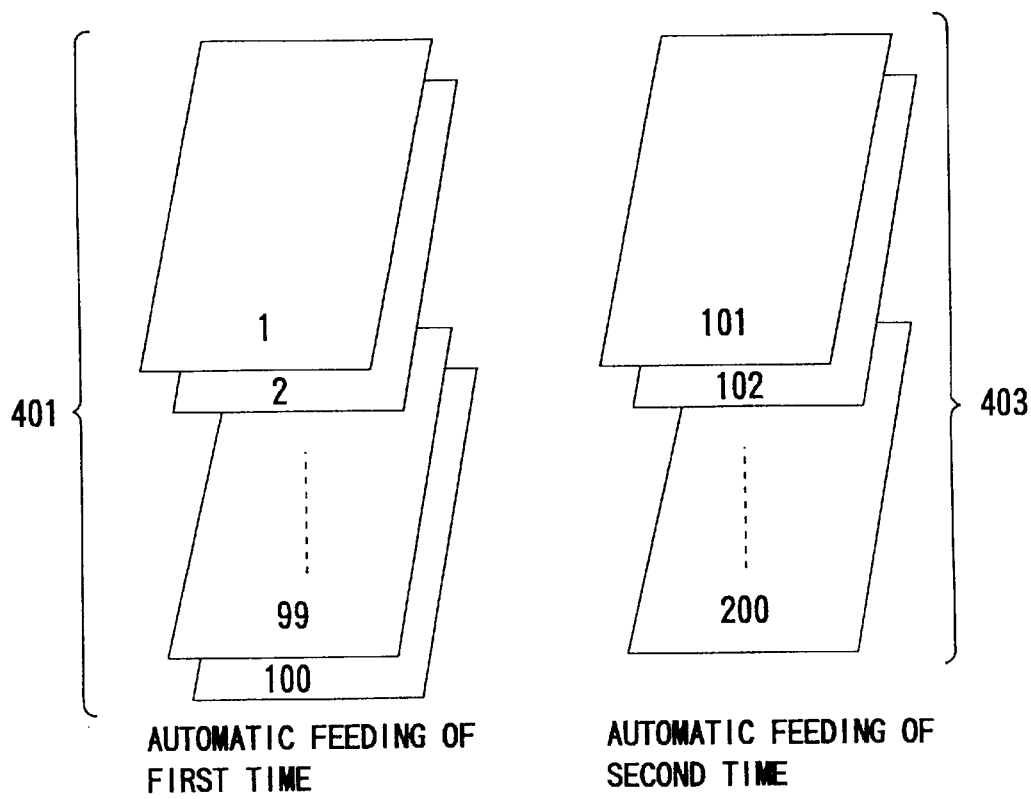
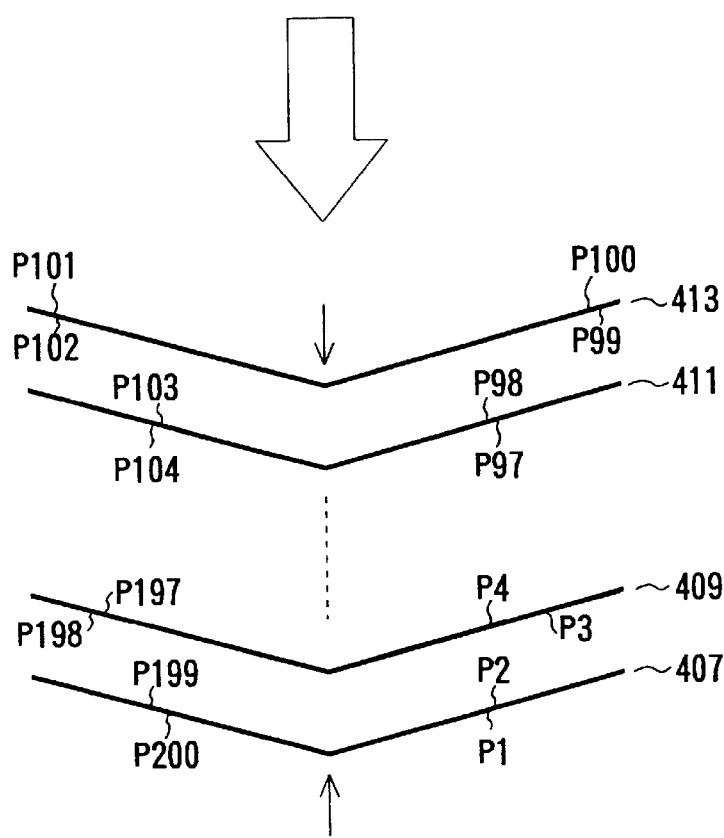
F I G. 18

ND,278

IMAGE FORMING APPARATUS AND METHOD WHICH PROCESSES ORIGINALS FED BY A PLURALITY OF AUTOMATIC DOCUMENT FEEDING OPERATIONS AS A SERIES OF ORIGINALS

BACKGROUND OF THE INVENTION

1. Field of the Invention

The present invention relates to an image forming apparatus having, e.g., an electronic sort function which changes the output order of read image information and an automatic document feeder, and an image forming method.

2. Description of the Related Art

In recent years, image forming apparatuses such as a digital copying machine having an electronic sort function which changes the output order of read image information are put into practical use.

Electronic sort processing using an automatic document feeder will be described below, assuming that two copies of continuous one-side originals consisting of a total of three pages are prepared.

First, the originals as copy targets are set at a predetermined position of an automatic document feeder. At this time, the originals are set at the predetermined position of the automatic document feeder in the order of page 1→page 2→page 3 from the upper side. An electronic sort mode is designated, and copying is started. The originals are fed from the automatic document feeder onto an original table in the order of page 3→page 2→page 1. The image data are scanned and read in a page memory in the order of page 3→page 2→page 1.

Subsequently, the image data are output from the page memory to a printer in the order of page 3→page 2→page 1→page 3→page 2→page 1, so that images are formed on paper sheets. The delivered paper sheets are stacked in the order of page 1→page 2→page 3→page 1→page 2→page 3 from the upper side. Only by separating the paper sheets into two groups, the operator can obtain two copies.

However, when the number of originals as copy targets exceeds the capacity of the automatic document feeder, the originals are divided such that the number of originals becomes equal to or smaller than the capacity of the automatic document feeder. Electronic sort processing is separately executed a plurality of number of times, resulting in the following problem.

An example will be described below in which originals more than the capacity (e.g., 100) of the automatic document feeder, e.g., two copies of 200 one-side originals with a total of 200 pages are to be prepared. To make the number of originals as copy targets equal to or smaller than the capacity of the automatic document feeder, the originals are separated into two groups each consisting of 100 originals and set at a predetermined position of the automatic document feeder.

The originals to be set first are set at a predetermined position of the automatic document feeder in the order of page 1→page 2 . . . page 99→page 100 from the upper side. The electronic sort mode is designated, and copying is started. The originals are fed from the automatic document feeder onto the original table in the order of page 100→page 99 . . . page 2→page 1. The image data are scanned and read in a page memory in the order of page 100→page 99 . . . page 2→page 1.

Subsequently, the image data are output from the page memory to a printer in the order of page 100→page 99 . . . page 2→page 1→page 100→page 99 . . . page 2→page 1, so that images are formed on paper sheets. The paper sheets delivered at this time point are stacked in the order of page 1→page 2 . . . page 99→page 100→page 1→page 2 . . . page 99→page 100 from the upper side.

The remaining originals to be set next are set at the predetermined position of the automatic document feeder in the order of page 101→page 102 . . . page 199→page 200 from the upper side. The electronic sort mode is designated, and copying is started. The originals are fed from the automatic document feeder onto the original table in the order of page 200→page 199 . . . page 102→page 101. The image data are scanned and read in the page memory in the order of page 200→page 199 . . . page 102→page 101.

The image data are output from the page memory to the printer in the order of page 200→page 199 . . . page 102→page 101→page 200→page 199 . . . page 102→page 101, so that images are formed on paper sheets. At this time, the paper sheets are delivered onto the previously stacked paper sheets. Consequently, the paper sheets are stacked in the order of page 101→page 102 . . . page 199→page 200→page 101→page 102 . . . page 199→page 200→page 1→page 2 . . . page 99 page 100→page 1→page 2 . . . page 99→page 100 from the upper side. To obtain desired sets of continuous sheets in the order of page 1→. . . page 200, the operator must change the order of these stacked paper sheets.

As described above, when the number of originals as copy targets exceeds the capacity of the automatic document feeder, the originals are divided such that the number of originals becomes equal to or smaller than the capacity of the automatic document feeder, and the electronic sort mode is executed a plurality of number of times. As a result, the originals are output in the order different from a desired order, and the operator must change the order of the paper sheets.

SUMMARY OF THE INVENTION

It is an object of the present invention to provide an image forming apparatus having an electronic sort function which enables to stacking originals separately set on an automatic document feeder a plurality of number of times in a desired order.

According to the present invention, there is provided an image forming apparatus comprising means for feeding a predetermined number of originals from an original tray to be set the originals to a predetermined position where the plurality of originals are read; means for selecting a continuous mode, in the continuous mode the plurality of originals which are separately fed from the original tray a plurality of number of times, are processed as a series of originals; means for reading a plurality of images of the plurality of originals fed by the feeding means; means for storing, as a series of images, the plurality of images of the reading means from the plurality of originals which are fed by the feeding means while the continuous mode is selected by the selecting means; and means for forming the plurality of images stored in the storing means in a predetermined order.

According to the present invention, the following functions/effects can be obtained with the above arrangement. More specifically, assume that originals more than the capacity of the original tray of an automatic document feeder are separately, continuously fed automatically a plurality of number of times, and electronic sort printing is performed. In the prior art, when originals are continuously, automatically fed twice, electronic sort printing is also performed twice in accordance with the feeding operation. The images of the originals read in the first feeding operation and those read in the second feeding operation are completely separated and printed. Therefore, the original images read in the first feeding operation cannot be synthesized with those read in the second feeding operation on one paper sheet.

According to the arrangement of the present invention, however, when a so-called continuous mode is selected, automatic original feeding is repeated a necessary number of times, and all the original images are stored as a series of images. Electronic sort printing is performed only after automatic document feeding is completed. Following these procedures, a large number of originals can be printed as a series of originals, as needed, without being limited by the capacity of the original tray of the feeding means (ADF).

More specifically, according to the present invention, magazine binding of a large number of original images, as shown in FIG. 18, can also be realized. In FIG. 18, the capacity of the original tray is 100. For 200 originals, document feeding is performed twice. Conventionally, print processing is also independently performed. In the present invention, however, after all images are stored in the page memory, print processing is performed. Therefore, the original images of pages 1, 2, 199, and 200 can be formed on a first paper sheet 407; the original images of pages 3, 4, 197, and 198, on a second paper sheet 409; . . . , the original images of pages 97, 98, 103, and 104, on a 49th paper sheet 411; and the original images of pages 99, 100, 101, and 102, on a 50th paper sheet 413.

Therefore, according to the image forming apparatus and method of the present invention, electronic sort printing in an order corresponding to the feeder specifications can be realized even for a large number of originals without being limited by the capacity of the automatic document feeder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing a page memory of, e.g., a digital copying machine control system;

FIG. 7 is a block diagram showing the main control unit of the digital copying machine;

FIG. 8 is a block diagram showing a printer unit;

FIG. 16 is a flow chart for explaining ADF continuous use processing according to the second embodiment of the present invention;

FIG. 18 is a view showing an example of magazine binding by electronic sort printing.

DETAILED DESCRIPTION OF THE PREFERRED EMBODIMENTS

An embodiment of the present invention will be described below with reference to the accompanying drawings.

Figure 1:
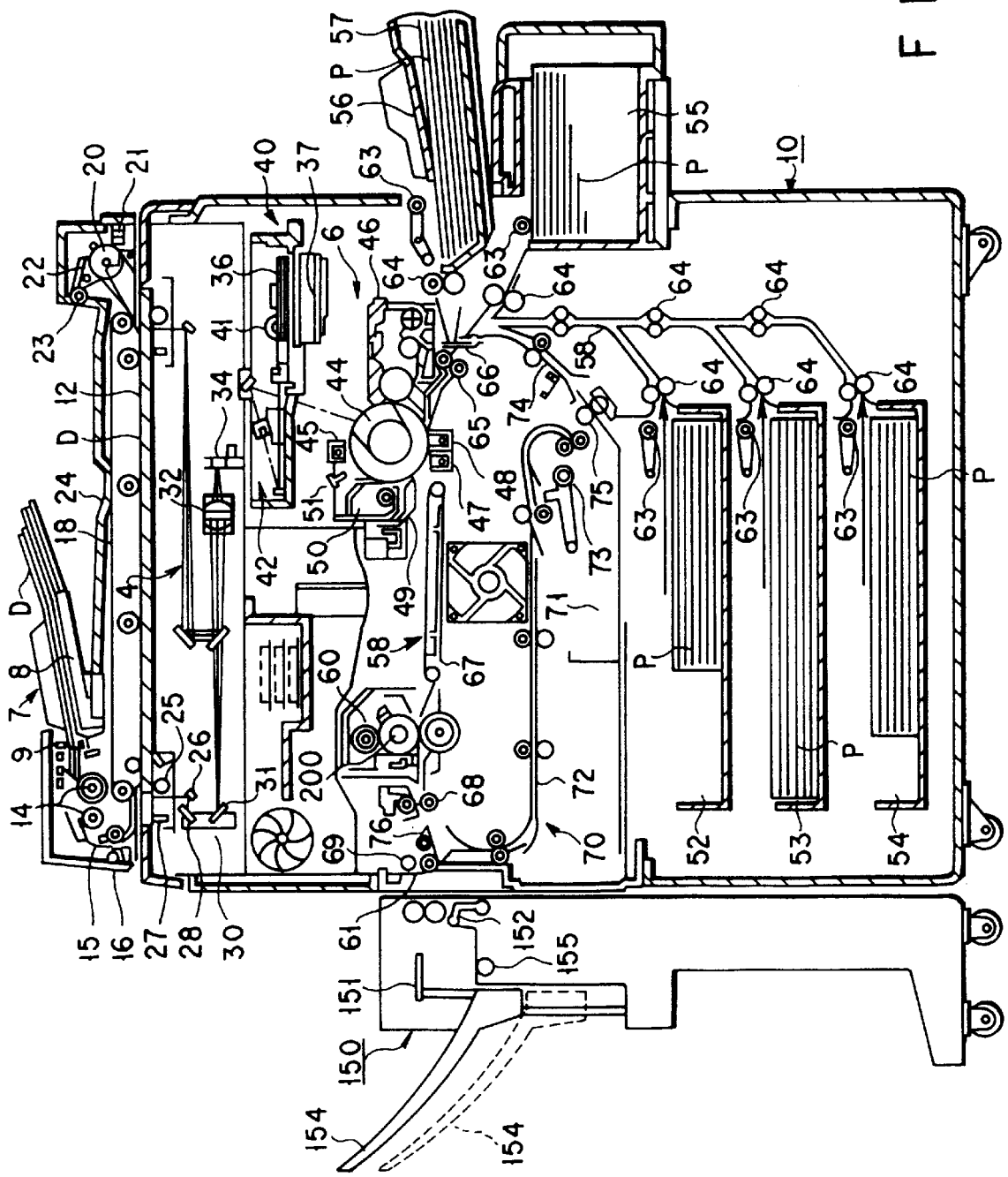
FIG. 1 is a schematic view showing the internal structure of a digital copying machine as an example of an image forming apparatus of the present invention.

FIG. 1 is a schematic view showing the internal structure of a digital copying machine as an example of an image forming apparatus of the present invention.

As shown in FIG. 1, the digital copying machine has an apparatus main body 10, and the apparatus main body 10 incorporates a scanner unit 4 and a printer unit 6, which will be described later.

A document table 12 consisting of a transparent glass material, on which read targets, i.e., originals D are set, is provided on the upper surface of the apparatus main body 10. An automatic document feeder 7 (to be abbreviated as an ADF hereinafter) is arranged on the upper surface of the apparatus main body 10 to automatically feed originals onto the document table 12. The ADF 7 can be freely closed/opened with respect to the document table 12 and also serves as an original press member for bringing the originals D set on the document table 12 into tight contact with the document table 12.

The ADF 7 comprises an original tray 8 on which the originals D are set, an empty sensor 9 for detecting the presence/absence of originals, a pickup roller 14 for picking up the originals from the original tray 8 one by one, a feed roller 15 for feeding the picked-up originals, an aligning roller pair 16 for aligning the leading edges of the originals, and a feed belt 18 arranged to almost entirely cover the document table 12. A plurality of originals set on the original tray 8 with their image-bearing surfaces facing up are sequentially picked up from the lowermost page, i.e., the final page, aligned by the aligning roller pair 16, and then fed to a predetermined position of the document table 12 by the feed belt 18. In this case, the ADF 7 is of a lower-side pickup type. However, an ADF of an upper-side pickup type may be used.

In the ADF 7, a reversing roller 20, a non-reverse sensor 21, a flapper 22, and a delivery roller 23 are arranged at the end portion to oppose the aligning roller pair 16 through the feed belt 18. After image information is read by the scanner unit 4 (to be described later), the original D is fed from the document table 12 by the feed belt 18, and delivered onto an original delivery unit 24 on the upper surface of the ADF 7 through the reversing roller 20, the flapper 22, and the delivery roller 23. When the lower surface of the original D is to be read, the flapper 22 is switched. The original D fed by the feed belt 18 is reversed by the reversing roller 20, and fed to a predetermined position on the document table 12 by the feed belt 18 again.

The scanner unit 4 disposed in the apparatus main body 10 has an exposure lamp 25 serving as a light source for illuminating the original D placed on the document table 12, and a first mirror 26 for deflecting a light beam reflected by the original D in a predetermined direction. The exposure lamp 25 and the first mirror 26 are attached to a first carriage 27 disposed under the document table 12.

The first carriage 27 is arranged to freely move parallel to the document table 12 and reciprocates under the document table 12 by a driving motor through a toothed belt or the like (not shown).

A second carriage 28 which can move parallel to the document table 12 is disposed underneath the document table 12. Second and third mirrors 30 and 31 are attached to the second carriage 28 to be perpendicular to each other, thereby sequentially deflecting the reflected light from the original D, which is deflected by the first mirror 26. The second carriage 28 moves upon driving the first carriage 27 and is moved parallel to the document table 12 at a speed ½ that of the first carriage by the toothed belt for driving the first carriage 27.

An imaging lens 32 for focusing the reflected light from the third mirror 31 on the second carriage 28, and a CCD sensor 34 for receiving the reflected light focused by the imaging lens and photoelectrically converting the light are disposed beneath the document table 12. The imaging lens 32 is arranged in a plane including the optical axis of the light beam deflected by the third mirror 31 so as to be movable through a driving mechanism. The imaging lens 32 moves to form an image of the reflected light at a desired magnification. The CCD sensor 34 photoelectrically converts the incident reflected light and outputs an electrical signal corresponding to the read original D.

The printer unit 6 has a laser exposure unit 40 which acts as a latent image forming means. The laser exposure unit 40 comprises a semiconductor laser 41 serving as a light source, a polygonal mirror 36 serving as a scanning member for continuously deflecting a laser beam emitted from the semiconductor laser 41, a polygon motor 37 serving as a scanning motor for rotating the polygonal mirror 36 at a predetermined rotating speed (to be described later), and an optical system 42 which deflects the laser beam from the polygonal mirror and guides the laser beam to a photosensitive drum 44 (to be described later). The laser exposure unit 40 having the above arrangement is fixed and supported on a support frame (not shown) of the apparatus main body 10.

The semiconductor laser 41 is ON/OFF-controlled in accordance with the image information of the original D read by the scanner unit 4, facsimile transmission/reception document information, or the like. The laser beam is guided to the photosensitive drum 44 through the polygon mirror 36 and the optical system 42. The laser beam scans the outer surface of the photosensitive drum 44, thereby forming an electrostatic latent image on the outer surface of the photosensitive drum 44.

The printer unit 6 has the rotatable photosensitive drum 44 serving as an image carrier and disposed almost at the center of the apparatus main body 10. The outer surface of the photosensitive drum 44 is exposed with a laser beam from the laser exposure unit 40, so that a desired electrostatic latent image is formed. A charger 45 which charges the outer surface of the drum to a predetermined potential, a developing device 46 which supplies developer, i.e., toner to the electrostatic latent image formed on the outer surface of the photosensitive drum 44 and develops the electrostatic latent image at a desired image density, a transfer charger 48 which integrally has a peel charger 47 for separating a target transfer medium, i.e., a copy paper sheet P fed from a paper cassette (to be described later) from the photosensitive drum 44, and transfers the toner image formed on the photosensitive drum 44 to the paper sheet P, a peel gripper 49 which separates the copy paper sheet P from the outer surface of the photosensitive drum 44, a cleaning unit 50 for cleaning all residual toner on the outer surface of the photosensitive drum 44, and a charge-removal lamp 51 for removing all excess charge on the outer surface of the photosensitive drum 44 are sequentially arranged around the photosensitive drum 44.

An upper cassette 52, a middle cassette 53, and a lower cassette 54, which can be pulled from the apparatus main body, are stacked at the lower portion in the apparatus main body 10. Copy paper sheets in different sizes are loaded in the respective cassettes. A large capacity feeder 55 is arranged aside these cassettes. About 300 copy paper sheets P in a popular size, e.g., A4 copy paper sheets P are stored in the large capacity feeder 55. A feeding cassette 57 commonly used as a manual feeding tray 56 is detachably mounted above the large capacity feeder 55.

A feed path 58 is formed in the apparatus main body 10 to extend from the respective cassettes and the large capacity feeder 55 through a transfer unit between the photosensitive drum 44 and the transfer charger 48. A fixing unit 60 having a fixing lamp 200 is arranged at the end of the feed path 58. A delivery port 61 is formed in the side wall of the apparatus main body 10 to oppose the fixing unit 60. A finisher 150 is mounted on the delivery port 61.

Pickup rollers 63 are arranged near the upper cassette 52, the middle cassette 53, the lower cassette 54, the feeding cassette 57, and the large capacity feeder 55, respectively, to pick up the paper sheets P one by one from the cassette or the large capacity feeder. A lot of feed roller pairs 64 are provided along the feed path 58 to convey the copy paper sheet P picked up by the pickup roller 63 through the feed path 58.

A registering roller pair 65 are provided upstream the photosensitive drum 44 in the feed path 58. The registering roller pair 65 correct any ramp of the picked-up copy paper sheet P, and also align the leading edge of the toner image on the photosensitive drum 44 with that of the copy paper sheet P, and feeds the copy paper sheet P to the transfer unit at the same speed as the moving speed of the outer surface of the photosensitive drum 44. An aligning front sensor 66 for detecting the arrival of the copy paper sheet P is arranged before the registering roller pair 65, i.e., on the feed roller pairs 64 side.

The copy paper sheet P picked up from the cassette or the large capacity feeder 55 one by one by the pickup roller 63 is fed to the registering roller pair 65 by the feed roller pairs 64. After the leading edge of the copy paper sheet P is aligned by the registering roller pair 65, the copy paper sheet P is fed to the transfer unit.

In the transfer unit, the developer image, i.e., the toner image formed on the photosensitive drum 44 is transferred to the surface of the paper sheet P by the transfer charger 48. The copy paper sheet P on which the toner image is transferred is separated from the outer surface of the photosensitive drum 44 by the function of the peel charger 47 and the peel gripper 49, and fed to the fixing unit 60 through a feed belt 67 which constitutes part of the feed path 58. After the developer image is fused and fixed on the copy paper sheet P by the fixing unit 60, the copy paper sheet P is delivered onto the finisher 150 by a feed roller pair 68 and a delivery roller pair 69 through the delivery port 61.

An automatic both-side copying unit 70 for reversing the copy paper sheet P which has passed through the fixing unit 60 and feeding the copy paper sheet P again to the registering roller pair 65 is arranged below the feed path 58. The automatic both-side copying unit 70 comprises a temporary stack 71 for temporarily stacking the copy paper sheets P. a reversing path 72 which branches off from the feed path 58 to reverse the copy paper sheet P passing through the fixing unit 60 and guide the copy paper sheet P to the temporary stack 71, a pickup roller 73 for picking up the copy paper sheets P stacked on the temporarily stack one by one, and a feed roller 75 for feeding the picked-up paper sheet to the registering roller pair 65 through a feed path 74. A selector gate 76 for selectively guiding the copy paper sheets P to the delivery port 61 or the reversing path 72 is arranged at the branch portion between the feed path 58 and the reversing path 72.

In the both-side copy operation, copy paper sheets P which have passed through the fixing unit 60 are guided to the reversing path 72 through the selector gate 76, and temporarily stacked in the temporary stack 71 while being kept reversed. The copy paper sheets P are fed to the registering roller pair 65 by the pickup roller 73 and the feed roller 75 through the feed path 74. The copy paper sheets P are aligned by the registering roller pair 65 and fed to the transfer unit again so that a toner image is transferred to the lower surface of each copy paper sheet P. Thereafter, the copy paper sheets P are delivered onto the finisher 150 through the feed path 58, the fixing unit 60, and the delivery roller pair 69.

Figure 2:
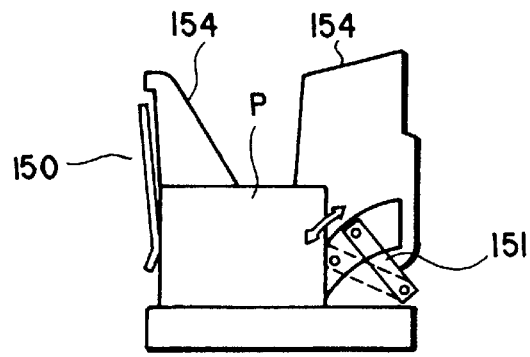
FIG. 2 is a view for explaining a finisher.
Figure 3:
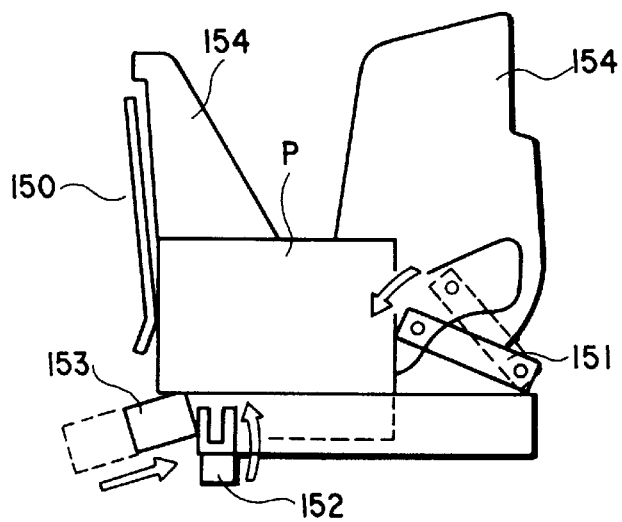
FIG. 3 is a view for explaining the finisher.
Figure 4:
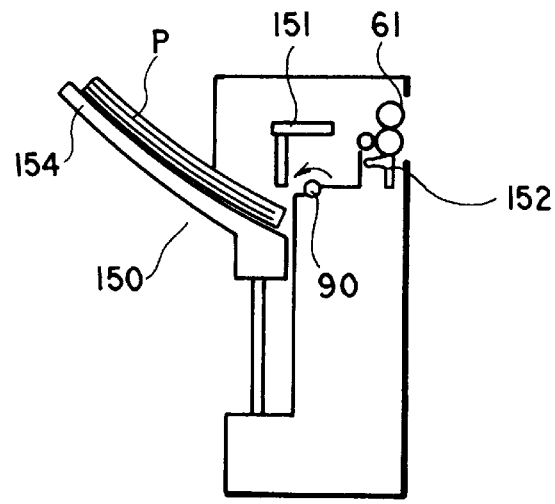
FIG. 4 is a view for explaining the finisher.

The finisher 150 staples delivered originals in units of copies and stores the copies. As shown in FIG. 2, every time one copy paper sheet P to be stapled is delivered from the delivery port 61, the copy paper sheet P is put aside by a guide bar 151 and aligned. When all paper sheets are delivered, a paper press arm 152 presses a group of delivered copy paper sheets P, and the copy paper sheets P are stapled by a stapler unit 153. Thereafter, the guide bar 151 is lowered to a position indicated by the broken line in FIG. 3. The stapled copy paper sheets P are delivered to a finisher delivery tray 154 in units of copies by a finisher delivery roller 155, as shown in FIG. 4. The moving amount of the finisher delivery tray 154 is approximately determined depending on the number of copy paper sheets P to be delivered, so that the finisher delivery tray 154 is lowered stepwise every time the sheets are delivered in units of copies. The guide bar 151 for aligning the delivered copy paper sheets P is arranged not to contact the stapled copy paper sheets P on the finisher delivery tray 154.

Figure 6:
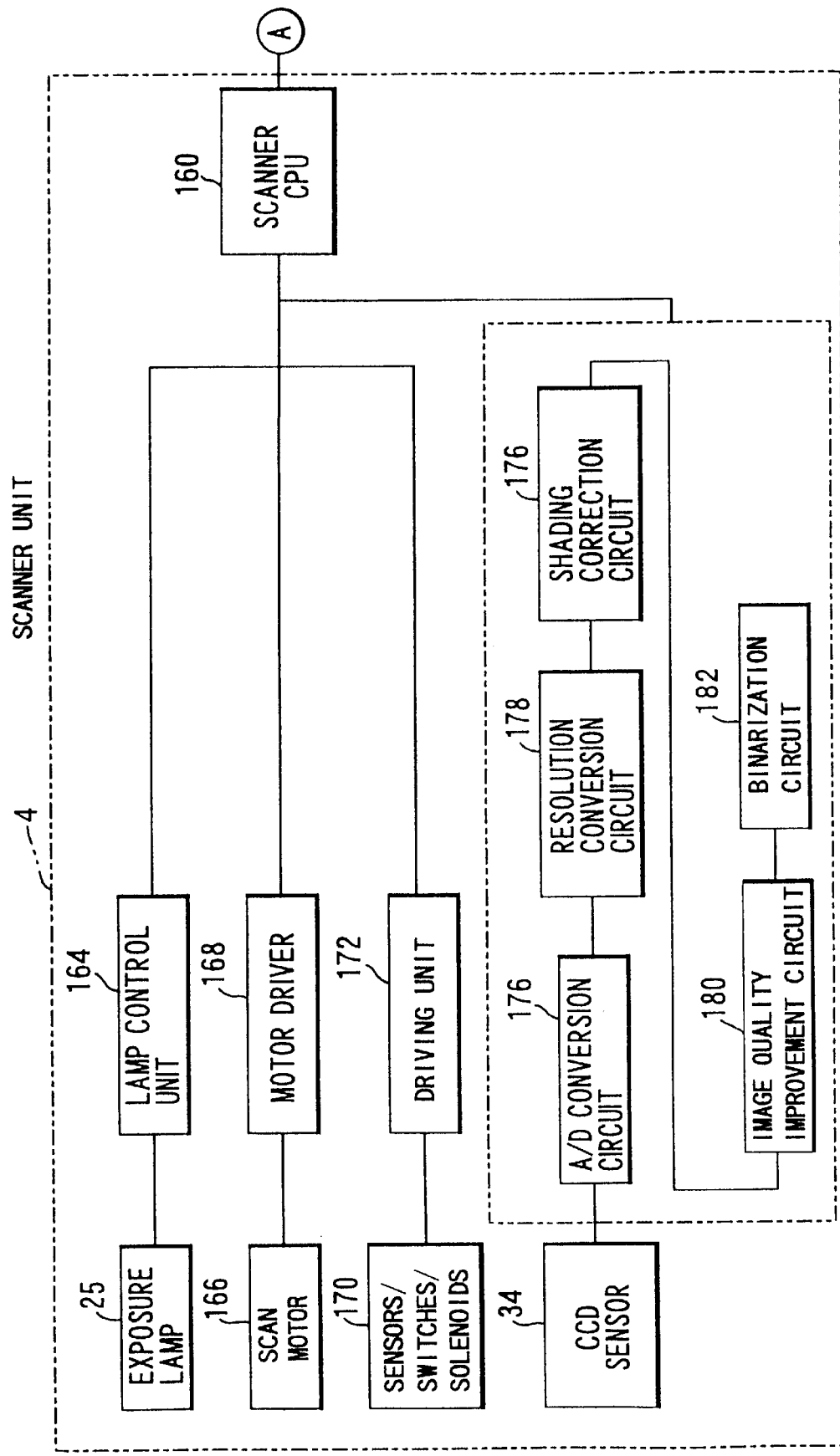
FIG. 6 is a block diagram showing a scanner unit.

The control circuit of the digital copying machine described in FIG. 1 will be described below with reference to FIGS. 5 to 8. FIG. 5 is a block diagram showing the page memory of, e.g., the digital copying machine control system. FIG. 6 is a block diagram showing the scanner unit 4. FIG. 7 is a block diagram showing the main control unit of the digital copying machine. FIG. 8 is a block diagram showing the printer unit 6.

The digital copying machine control system can be roughly divided into two blocks: a base unit 301 constituting the digital copying machine in which the scanner unit 4 and the printer unit 6 are connected through an image processing unit 314, and a page memory unit 302 which receives image data from the base unit 301, stores the image data, and transfers the stored image data to the base unit 301 again, thereby realizing memory copy.

The base unit 301 and the page memory unit 302 are connected through a base unit system interface 316 for transferring control data, and a base unit image interface 317 for transferring image data. The base unit 301 is constituted by the scanner unit 4, the printer unit 6, the image processing unit 314, and a base unit CPU 311 for controlling the respective units.

As shown in FIG. 7, a main CPU 100 of the base unit CPU 311 is connected to a ROM 102, a RAM 104, an image memory 106, a timer 112, an internal interface 122, an external interface 124, and a printer interface 128.

An operating panel 114 is connected to the internal interface 122. The operating panel 114 has a print key 115 for instructing the start of copy processing, a touch panel 116 serving as an input unit for receiving conditions for image output, and the like, and a ten-key pad 117 used to set the number of copies and the copy magnification. The touch panel 116 is arranged in accordance with the operation procedures associated with the digital copying machine or conditions to be input, on which icons, numbers, characters, or character strings are displayed. Designation of the number of copies, the copy magnification, or partial copy processing, input of the coordinates of a partial copy area, or designation of an electronic sort mode is made on the touch panel 116.

The external interface 124 is connected to an external unit 125. The printer interface 128 is connected to an external unit 138.

Read/write of image information is performed by the main CPU 100. When image information is to be stored, image information read by the scanner unit 4 under the control of a scanner CPU 160 is stored in the image memory 106 in accordance with an instruction from the main CPU 100. For the instruction of the main CPU 100, a mode is determined by input (key input) from the operating panel 114.

The details of the arrangement of the scanner unit 4 will be described below with reference to FIG. 6.

The scanner CPU 160 of the scanner unit 4 is connected to a lamp control unit 164 for controlling the exposure lamp 25, a motor driver 168 for controlling a scan motor 166 for driving the first carriage 27 and the second carriage 28, and a driving unit 172 for driving and controlling sensors/switches/solenoids 170, thereby controlling these respective portions.

The scanner CPU 160 is also connected to an A/D conversion circuit 176, a resolution conversion circuit 178, a shading correction circuit 176, an image quality improvement circuit 180, and a binarization circuit 182, which perform image processing for image information from the CCD sensor 34, thereby controlling these respective portions.

The printer unit 6 will be described below in detail with reference to FIG. 8.

A printer CPU 190 of the printer unit 6 is connected to a main motor driver 194 for driving a main motor 192, a driving unit 198 for driving and controlling sensors/switches/solenoids 196, a fixing lamp control unit 202 for controlling the fixing lamp 200, a high-voltage output control unit 212 for controlling the charger 45, the transfer charger 48, the peel charger 47, and a PCC charger 210, a charge-removal lamp control unit 216 for controlling the charge-removal lamp 51, a feed control unit 224 for controlling a feed motor 222 for the feed rollers 15 and 64 and the pickup rollers 14 and 63, and a modulation circuit 232 for controlling a laser driving circuit 230 for a polygon motor 228 which drives the semiconductor laser 41 and the polygon mirror 36, thereby controlling these respective portions.

The page memory unit 302 will be described below with reference to FIG. 5.

The page memory unit 302 comprises a page memory PM 323 for temporarily storing image data, an address control unit 306 for generating the addresses of the page memory PM 323, an image bus 320 for performing data transfer between the respective devices in the page memory unit 302, a data control unit 307 for controlling data transfer between the page memory PM 323 and other devices through the image bus 320, an image data I/F 308 for interfacing image data which is transferred between the page memory unit and the base unit 301 through the base unit image interface 317, a resolution conversion/binarization rotation unit 325 which converts image data to be transferred to a device with a different resolution in accordance with the resolution, converts image data received from a device with a different resolution in accordance with the resolution of the printer unit 6 of the base unit 301, or executes 90-degree rotation processing of binary image data, a compression/expansion unit 324 which compresses input image data for a device for transmitting or storing compressed image data as in facsimile transmission or optical disk memory, or expands compressed image data to make the image data visible through the printer unit 6, and a multi-valued rotation memory 309 connected to the image data I/F 308 and used to rotate image data by 90° or −90° and output the image data from the printer unit 6.

An original image read operation will be briefly described below.

The image information of an original set on the document table 12 is read by the CCD sensor 34 of the scanner unit 4. The read image information is quantized and written in the page memory PM 323.

When the ADF 7 is to be used, originals set on the original tray 8 of the ADF 7 are sequentially fed from the lower side, i.e., from the final page onto the document table 12. The image information of the fed original is read. The read image information is quantized and written in the page memory PM 323. When both-side copy processing is designated, the image information are sequentially read starting from the final page in the order of lower surface upper surface up to the first page.

When the remaining memory capacity of the page memory PM 323 becomes zero, the input operation is stopped, and all image data input/compressed/accumulated so far are deleted. Alternatively, all image data input/compressed/accumulated so far are output.

When all the originals set on the original tray 8 of the ADF 7 are read, image formation is started in units of sheet surfaces. When both-side copy processing is designated, image formation is started in correspondence with the order of accommodation in the automatic both-side copying unit 70.

Paper sheets with their lower surfaces printed are stacked first in the automatic both-side copying unit. A paper sheet with its lower surface already printed is fed. An image to be formed on the upper surface of the paper sheet with its lower surface printed is formed on the upper surface of the paper sheet, and the paper sheet is delivered. This operation is repeated, thereby completing both-side copy processing. When both-side copy processing is to be executed for a large number of paper sheets, only images to be formed on the lower surfaces of paper sheets are sequentially printed on their lower surfaces, and the paper sheets are stacked in the automatic both-side copying unit 70. The paper sheets with their lower surfaces already printed are sequentially fed. Images to be formed on the upper surfaces of the paper sheets with their lower surfaces already printed are sequentially formed on their upper surfaces.

Figure 9:
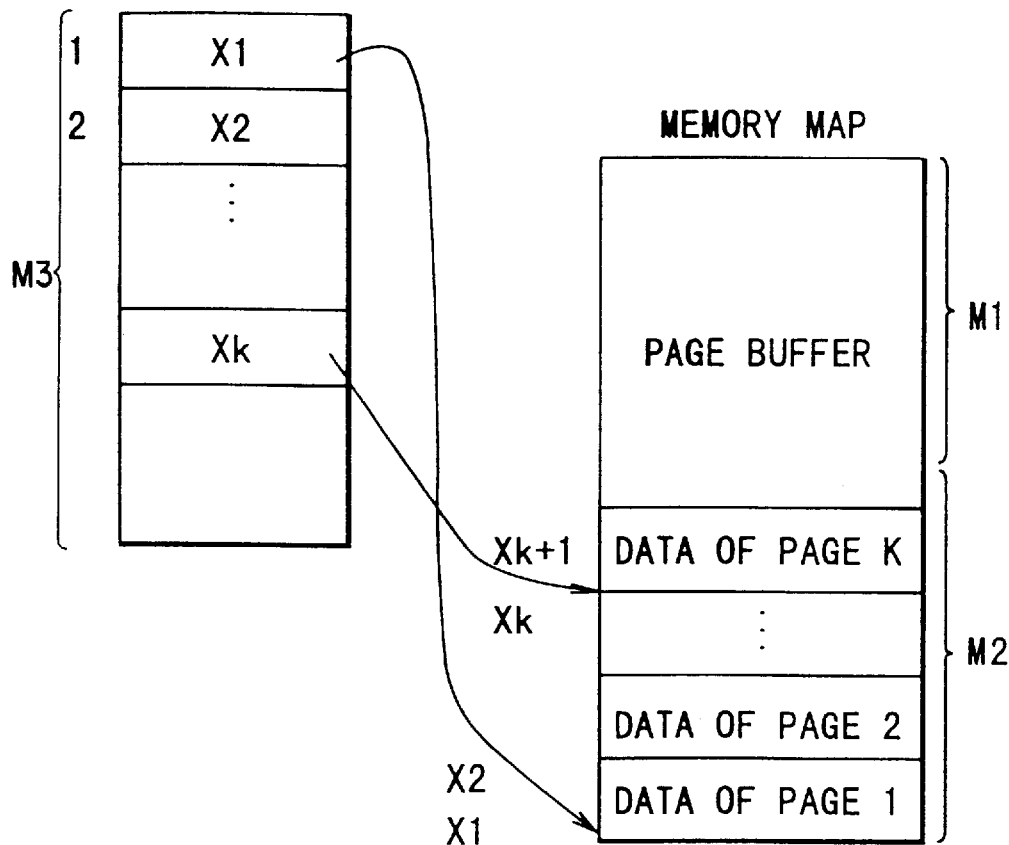
FIG. 9 is a view for explaining the page memory in detail.

The page memory 323 will be described below. As shown in FIG. 9, the page memory 323 is divided into a page buffer area M1 in which original image data read by the scanner unit 4 is written, and a file area M2 segmented in units of pages, in which compressed image data is written. The start address of each page of the file area M2 is stored in an area M3 for storing the data start addresses of the respective file areas.

The gist of the present invention, i.e., the electronic sort mode of the above-described digital copying machine will be described below. In the electronic sort mode according to the present invention, the "continuous model" is set such that originals which are separately set on the ADF 7 a plurality of number of times can be processed as a series of originals. The first, second, and third embodiments of the continuous mode will be described below on the basis of the specific manners of designating the continuous mode by the operator.

Figure 15:
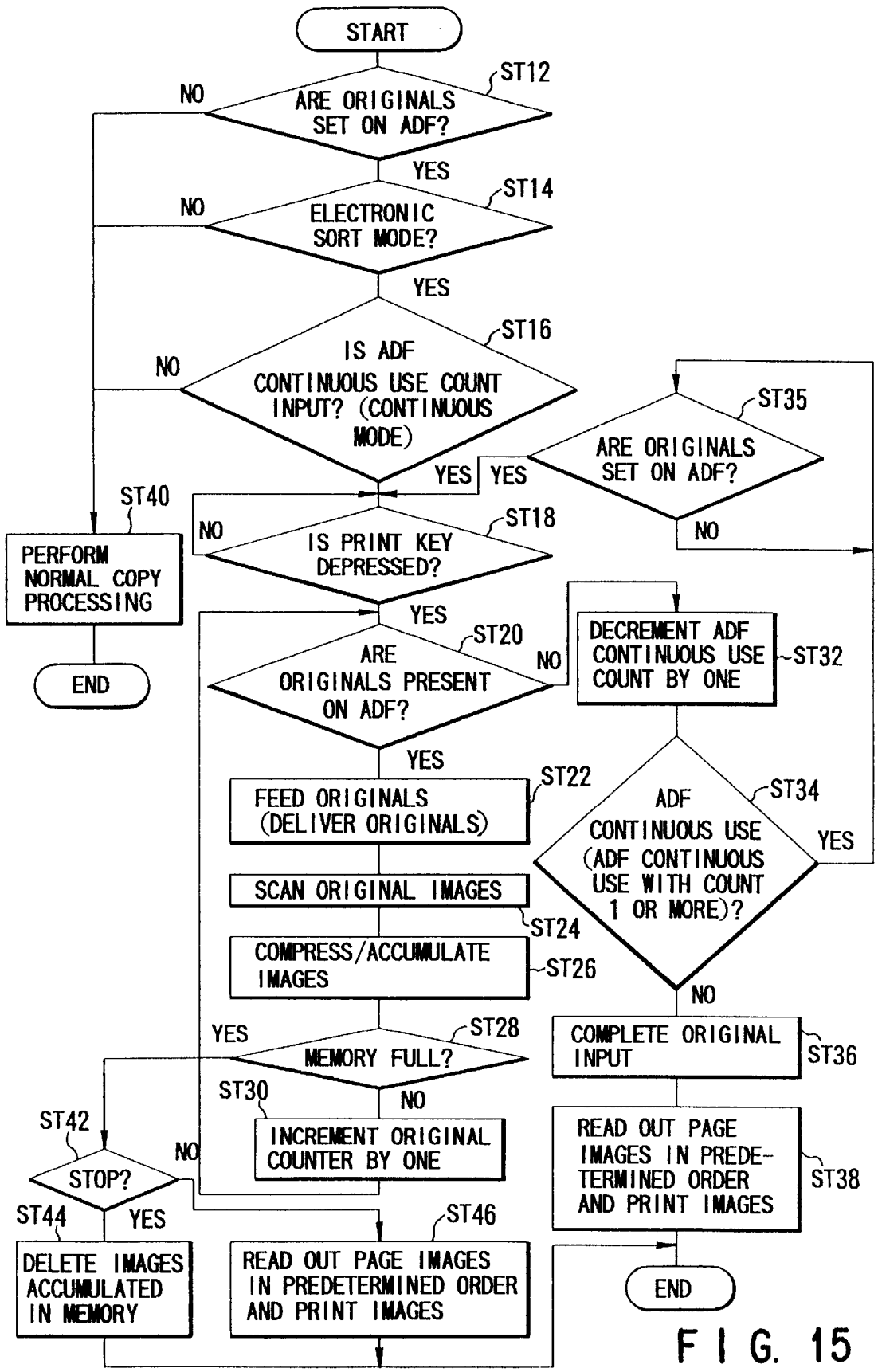
FIG. 15 is a flow chart for explaining ADF continuous use processing according to the first embodiment of the present invention.

The first embodiment will be described below with reference to the flow chart in FIG. 15. In the first embodiment, the continuous use count is input from a touch panel 116, thereby designating the ADF continuous use (continuous mode). When the continuous use count is not incremented, and the initial set count, i.e., "1" is kept set, the ADF is used only once as in a normal operation, so that normal print processing in the electronic sort mode is performed.

An example will be described below in which two copies of originals more than the capacity (e.g., 100) of an ADF 7, e.g., 200 one-side originals with a total of 200 pages are to be prepared. To make the number of originals as copy targets equal to or smaller than the capacity of the ADF 7, the originals must be separately set on the ADF 7, e.g., twice. At this time, the originals need not be equally divided.

Figure 10:
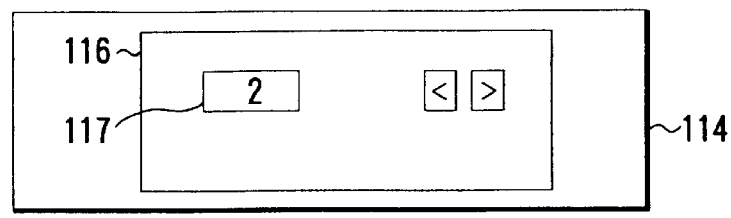
FIG. 10 is a view showing an ADF continuous use count input screen.

The first originals are set on a tray 8 of the ADF 7 in the order of page 1→page 2 . . . page (n−1)→page n from the upper side (YES in ST12). When the electronic sort mode is designated from the touch panel 116 (YES in ST14), an ADF continuous use count input screen as shown in FIG. 10 is displayed on the touch panel 116. The operator inputs the continuous use count of the ADF, e.g., "2" in advance from this ADF continuous use count input screen (YES in ST16). With this operation, a so-called "continuous mode" is selected such that the ADF can be used twice or more, unlike a normal mode in which the ADF is used only once. In this mode, all originals which are separately fed by the ADF several times are subjected to electronic sort printing.

When a print key 115 is depressed (YES in ST18), and the originals have already been set on the ADF 7 (YES in ST20), the originals are fed onto a document table 12 (ST22), and the original images are scanned (ST24).

Figure 11:
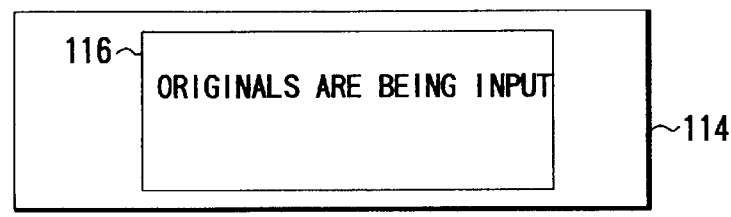
FIG. 11 is a view showing a screen which indicates that originals are being input.

The image information of the scanned originals is compressed and accumulated in a page memory PM 323 (ST26). At this time, a screen indicating that originals are being input is displayed on the touch panel 116, as shown in FIG. 11. Unless the remaining memory capacity of the page memory PM 323 becomes zero (NO in ST28), the number of originals is counted (ST30). By repeating the operations in ST22 to ST26, the originals set on the ADF 7 first are read.

Figure 12:
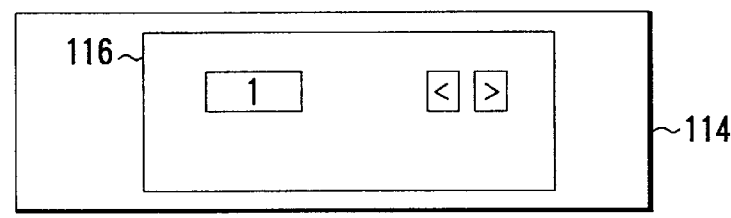
FIG. 12 is a view showing the ADF continuous use count input screen.

Upon completion of input of the first originals, i.e., when the absence of originals on the ADF 7 is detected (NO in ST20), the count value of the ADF continuous use count input screen is decremented by one (ST32). As shown in FIG. 12, the count value displayed on the ADF continuous use count input screen changes from "2" to "1". The count value "1" displayed on the ADF continuous use count input screen means that the ADF will be continuously used (YES in ST34), so a message is displayed on the touch panel 116 to prompt the operator to set the remaining originals.

In accordance with this display, the remaining originals are set on the tray 8 of the ADF 7 in the order of page (n+1)→page (n+2) ... page 199→page 200 from the upper side (YES in ST35). The originals are set, and the print key 115 is depressed (YES in ST18). At this time, since originals have already been set on the ADF 7 (YES in ST20), the originals are fed onto the document table 12 (ST22), and the original images are scanned (ST24).

The image information of the scanned originals is compressed and accumulated in the page memory PM 323 (ST26). At this time, a screen indicating that originals are being input is displayed on the touch panel 116, as shown in FIG. 11. Unless the remaining memory capacity of the page memory 323 becomes zero (NO in ST28), the number of originals is counted (ST30). By repeating the operations in ST 22 to ST26, the second originals set on the ADF 7 are read.

Upon completion of input of the second originals, i.e., when the absence of originals on the ADF 7 is detected (NO in ST20), the count value of the ADF continuous use count input screen is decremented by one (ST32). In this case, the count value displayed on the ADF continuous use count input screen changes from "1" to "0". The count value "0" displayed on the ADF continuous use count input screen means that the ADF continuous use is completed (NO in ST34). That is, the originals of pages 1 to 200 are completely input (ST36).

Next, the image data accumulated in the page memory PM 323 are read out in a predetermined order, and print processing is started (ST38). At this time, the image data are read out from the page memory PM 323 starting from the final page of the originals, i.e., page 200. More specifically, the image information is read out in the order of page 200→page 199 ... page (n+2)→page (n+1)→page n→page (n−1) ... page 2→page 1, and print processing is executed in this order.

Paper sheets are stacked on a delivery tray 154 in the order of page 1→page 2 ... page (n−1)→page n→page (n+1)→page (n+2) ... page 199→page 200 from the upper side. Therefore, two copies of originals from pages 1 to 200 can be obtained.

If no originals are set on the ADF 7 in ST12 (NO in ST12), an original is directly set on the document table 12, and normal copy processing is performed (ST40). If the electronic sort mode is not executed in ST14 (NO in ST14), normal copy processing for originals set on the ADF 7 is performed (ST40). If the ADF use count is not input from the ADF continuous use count input screen in ST16, normal copy processing for originals set on the ADF 7 is performed (ST40).

If the remaining memory capacity of the page memory PM 323 becomes zero in ST28 (YES in ST28), the series of processing are stopped (YES in ST42), and the image data accumulated in the page memory PM 323 so far are deleted (ST44). Alternatively, without stopping the series of processing (NO in ST42), the image data accumulated in the page memory PM 323 so far are read out in a predetermined order and printed (ST46). When, e.g., the saddle stitching (magazine binding) mode is designated, the image data accumulated in the page memory PM 323 so far are deleted. This is because, in such a case, saddle stitching is disabled even when the image data accumulated in the page memory are printed.

The order of storing image data in the page memory PM 323 in units of pages will be described below. The technique of storing image data in units of pages changes depending on the manner of setting originals on the ADF 7 and the original pickup style of the ADF.

Assume that when the ADF 7 is of the lower-side pickup type, i.e., when originals set on the ADF 7 are sequentially picked up from the lower side, the first originals are set in the order of page 1→page 2 ... page (n−1) page n from the upper side, and the second originals are set in the order of page (n+1)→page (n+2) ... page 199→page 200 from the upper side (this original setting style will be referred to as setting a series of originals from the upper side). In this case, the image data are stored in the page memory PM 323 such that the first page of the first originals connects with the final page of the second originals. More specifically, the image data are stored such that page n of the first originals connects with page (n+1) of the second originals. The image data are stored in the page memory PM 323 in the order of page 1→page 2 ... page (n−1)→page n→page (n+1)→page (n+2) ... page 199→page 200, so that the originals which are separately set a plurality of number of times can be processed as a series of originals.

Assume that when the ADF 7 is of the lower-side pickup type, the first originals are set in the order of page (n+1) →page (n+2) ... page 199→page 200 from the upper side, and the second originals are set in the order of page 1→page 2 ... page (n−1)→page n from the upper side (this original setting style will be referred to as setting a series of originals from the lower side). In this case, the image data are stored in the page memory PM 323 such that the final page of the first originals connects with the first page of the second originals. More specifically, the image data are stored in the page memory PM 323 such that page (n+1) of the first originals connects with page n of the second originals. The image data are stored in the page memory PM 323 in the order of page 1→page 2 ... page (n−1)→page n→page (n+1)→page (n+2) ... page 199→page 200, so that the originals which are separately set a plurality of number of times can be processed as a series of originals.

Assume that when the ADF 7 is of the upper-side pickup type, i.e., when originals set on the ADF 7 are sequentially picked up from the upper side, the first originals are set in the order of page 1→page 2 ... page (n+1)→page n from the upper side, and the second originals are set in the order of page (n+1)→page (n+2) ... page 199→page 200 from the upper side. In this case, the image data are stored in the page memory PM 323 such that the final page of the first originals connects with the first page of the second originals. More specifically, the image data are stored in the page memory PM 323 such that page n of the first originals connects with page (n+1) of the second originals. The image data are stored in the page memory PM 323 in the order of page 1→page 2 ... page (n−1)→page n→page (n+1)→page (n+2) ... page 199 page 200, so that the originals which are separately set a plurality of number of times can be processed as a series of originals.

Assume that, when the ADF 7 is of the upper-side pickup type, the first originals are set in the order of page (n+1) →page (n+2) . . . page 199→page 200 from the upper side, and the second originals are set in the order of page 1→page 2 . . . page (n−1)→page n from the upper side. In this case, the image data are stored in the page memory PM 323 such that the first page of the first originals connects with the final page of the second originals. More specifically, the image data are stored in the page memory PM 323 such that page (n+1) of the first originals connects with page n of the second originals. The image data are stored in the page memory PM 323 in the order of page 1→page 2 . . . page (n−1)→page n→page (n+1)→page (n+2) . . . page 199→page 200, so that the originals which are separately set a plurality of number of times can be processed as a series of originals.

The style of setting a series of originals from the upper side or setting a series of originals from the lower side, as described above, is determined in advance in accordance with the type of copying machine. The user sets originals in accordance with the setting style of the copying machine. Alternatively, the user may designate the setting style by using the operating panel or the like.

By arranging the order of storing image data in the page memory PM 323 as described above, originals which are separately set on the ADF 7 a plurality of number of times can be processed as a series of originals. Another technique is also available in which originals which are separately set a plurality of number of times can be processed as a series of originals on the basis of the order of reading out stored image data. This technique will be described below.

Assume that, when the ADF 7 is of the lower-side pickup type, the first originals are set in the order of page 1→page 2 . . . page (n−1)→page n from the upper side, and the second originals are set in the order of page (n+1)→page (n+2) . . . page 199→page 200 from the upper side. The first originals are read in the order of page n→page (n−1) . . . page 2→page 1, and read image data are stored in the page memory PM 323 in this order. The second originals are read in the order of page 200→page 199 . . . page (n+2)→page (n+1), and read image data are stored in the page memory PM 323 in this order. In this case, the image data are read out from the page memory PM 323 such that the first page of the first originals connects with the final page of the second originals. More specifically, the image data are read out such that page n of the first originals connects with page (n+1) of the second originals. The image data are read out from the page memory PM 323 in the order of page 1→page 2 . . . page (n−1)→page n →page (n+1)→page (n+2) . . . page 199 page 200, so that the originals which are separately set a plurality of number of times can be processed as a series of originals.

Assume that when the ADF 7 is of the lower-side pickup type, the first originals are set in the order of page (n+1) →page (n+2) . . . page 199→page 200 from the upper side, and the second originals are set in the order of page 1→page 2 . . . page (n−1)→page n from the upper side. The first originals are read in the order of page 200→page 199 . . . page (n+2)→page (n+1), and read image data are stored in the page memory PM 323 in this order. The second originals are read in the order of page n→page (n−1) . . . page 2 page 1, and read image data are stored in the page memory PM 323 in this order. In this case, the image data are read out from the page memory PM 323 such that the final page of the first originals connects with the first page of the second originals. More specifically, the image data are read out such that page (n+1) of the first originals connects with page n of the second originals. The image data are read out from the page memory PM 323 in the order of page 1→page 2 . . . page (n−1)→page n →page (n+1)→page (n+2) . . . page 199 page 200, so that the originals which are separately set a plurality of number of times can be processed as a series of originals.

Assume that when the ADF 7 is of the upper-side pickup type, the first originals are set in the order of page 1→page 2 . . . page (n−1)→page n from the upper side, and the second originals are set in the order of page (n+1)→page (n+2) . . . page 199→page 200 from the upper side. The first originals are read in the order of page 1→page 2 . . . page (n−1)→page n, and read image data are stored in the page memory PM 323 in this order. The second originals are read in the order of page (n+1)→page (n+2) . . . page 199 page 200, and read image data are stored in the page memory PM 323 in this order. In this case, the image data are read out from the page memory PM 323 such that the final page of the first originals connects with the first page of the second originals. More specifically, the image data are read out such that page n of the first originals connects with page (n+1) of the second originals. The image data are read out from the page memory PM 323 in the order of page 1→page 2 . . . page (n−1)→page n →page (n+1)→page (n+2) . . . page 199 page 200, so that the originals which are separately set a plurality of number of times can be processed as a series of originals.

Assume that when the ADF 7 is of the upper-side pickup type, the first originals are set in the order of page (n+1) →page (n+2) . . . page 199→page 200 from the upper side, and the second originals are set in the order of page 1→page 2 . . . page (n−1)→page n from the upper side. The first originals are read in the order of page (n+1)→page (n+2) . . . page 199→page 200, and read image data are stored in the page memory PM 323 in this order. The second originals are read in the order of page 1→page 2 . . . page (n−1)→page n, and read image data are stored in the page memory PM 323 in this order. In this case, the image data are read out from the page memory PM 323 such that the first page of the first originals connects with the final page of the second originals. More specifically, the image data are read out such that page (n+1) of the first originals connects with page n of the second originals. The image data are read out from the page memory PM 323 in the order of page 1→page 2 . . . page (n−1)→page n →page (n+1)→page (n+2) . . . page 199 page 200, so that the originals which are separately set a plurality of number of times can be processed as a series of originals.

The second embodiment will be described below with reference to the flow chart in FIG. 16. In the second embodiment, the ADF continuous use (continuous mode) is designated by touching an instruction region 118 which indicates "next original present" from a touch panel 116.

An example will be described below in which two copies of originals more than the capacity of an ADF 7, e.g., 200 one-side originals with a total of 200 pages are to be prepared. To make the number of originals as copy targets equal to or smaller than the capacity of the ADF 7, the originals must be separately set on the ADF 7, e.g., twice. At this time, the originals need not be equally divided.

The originals to be set first are set on a tray 8 of the ADF 7 in the order of page 1→page 2 . . . page (n−1)→page n from the upper side (YES in ST52). The electronic sort mode is designated from the touch panel 116 (YES in ST54), and a print key 115 is depressed (YES in ST56). Since the originals have already been set on the ADF 7 (YES in ST58), the originals are fed onto a document table 12 (ST60), and original images are scanned (ST62).

Figure 13:
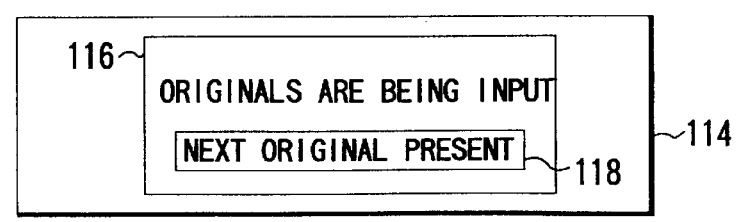
FIG. 13 is a view showing an ADF continuous use presence/absence instruction screen.

The image information of the scanned originals is compressed and accumulated in a page memory PM 323 (ST64). At this time, a screen indicating that originals are being input is displayed on the touch panel 116, as shown in FIG. 13. A "next original present" key for designating that the ADF continuous use mode is necessary is arranged on this screen. When this "next original present" key is depressed, the continuous use of the ADF 7 is enabled.

Unless the remaining memory capacity of the page memory PM 323 becomes zero (NO in ST66), the number of originals is counted (ST68). By repeating the operations in ST60 to ST64, the first set of originals set on the ADF 7 are read.

Upon completion of input of the first originals, i.e., when the absence of originals on the ADF 7 is detected (NO in ST58), and the "next original present" key is depressed (ST70), the ADF will be continuously used, so a message is displayed on the touch panel 116 to prompt the operator to set the remaining originals.

In accordance with this display, the remaining originals are set on the tray 8 of the ADF 7 in the order of page (n+1)→page (n+2) . . . page 199→page 200 from the upper side (YES in ST71). The originals are set, and the print key 115 is depressed (YES in ST56). At this time, since originals have already been set on the ADF 7 (YES in ST58), the originals are fed onto the document table 12 (ST60), and the original images are scanned (ST62).

The image information of the scanned originals is compressed and accumulated in the page memory PM 323 (ST64). At this time, a screen indicating that originals are being input is displayed on the touch panel 116, as shown in FIG. 13. In this example, since there is no original to be set on the ADF 7, the "next original present" key is not depressed.

Unless the remaining memory capacity of the page memory PM 323 becomes zero (NO in ST66), the number of originals is counted (ST68). By repeating the operations in ST60 to ST64, the originals set on the ADF 7 at the second time are read.

Upon completion of input of the second originals, i.e., when the absence of originals on the ADF 7 is detected (NO in ST58), the "next original present" key is not depressed (NO in ST70), and the continuous use of the ADF 7 is completely executed (YES in ST72), the originals of pages 1 to 200 are completely input (ST74).

Next, the image data accumulated in the page memory PM 323 are read out in a predetermined order, so that print processing is started (ST76). At this time, the image data are read out from the page memory PM 323 starting from the last page of the originals, i.e., page 200. More specifically, the image information are read out in the order of page 200→page 199 . . . page (n+2)→page (n+1)→page n→page (n−1) . . . page 2 page 1, and print processing is executed in this order.

Paper sheets are stacked on a delivery tray 154 in the order of page 1→page 2 . . . page (n−1)→page n page (n+1)→page (n+2) . . . page 199→page 200 from the upper side. Therefore, two copies of originals of pages 1 to 200 can be obtained.

If no originals are set on the ADF 7 in ST52 (NO in ST52), an original is directly set on the document table 12, and normal copy processing is performed (ST78). If the electronic sort mode is not executed in ST54 (NO in ST54), normal copy processing for originals set on the ADF 7 is performed (ST78).

If the remaining memory capacity of the page memory PM 323 becomes zero in ST66 (YES in ST66), the series of processing are stopped (YES in ST80), and the image data accumulated in the page memory PM 323 so far are deleted (ST82). Alternatively, without stopping the series of processing (NO in ST80), the image data accumulated in the page memory PM 323 so far are read out in a predetermined order and printed (ST84).

Processing of storing image data in the page memory PM 323 and processing of reading out the image data from the page memory PM 323 are the same as those described in the first embodiment, and a detailed description thereof will be omitted.

Figure 14:
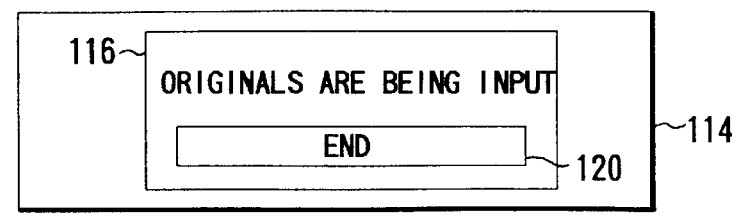
FIG. 14 is a view showing a screen for receiving the end of the ADF continuous use.
Figure 17:
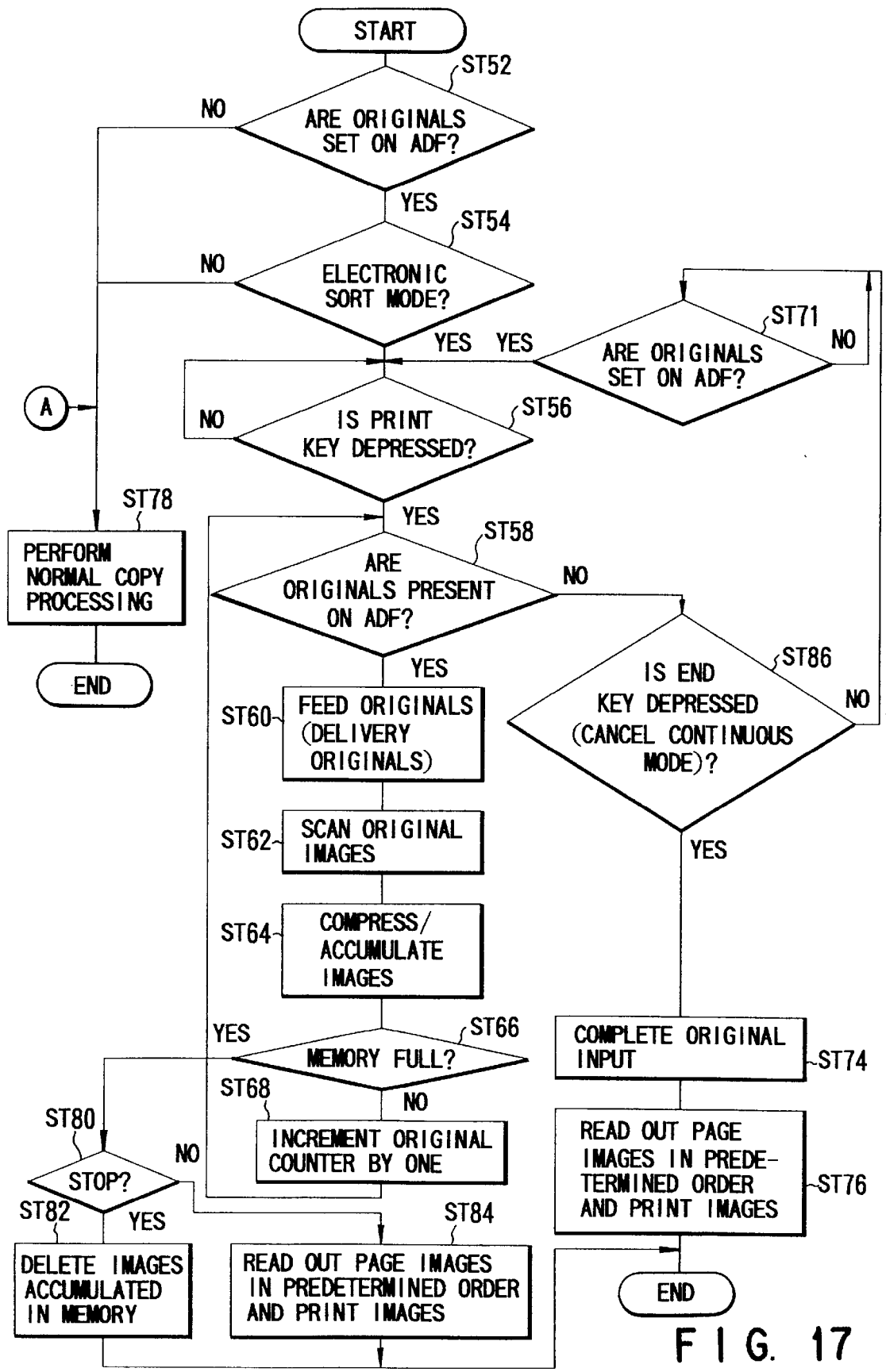
FIG. 17 is a flow chart for explaining ADF continuous use processing according to the third embodiment of the present invention.

The third embodiment of the present invention will be described below with reference to the flow chart in FIG. 17. In the third embodiment, when the electronic sort mode is selected, the continuous mode is automatically set. When an end region 120 in a touch panel shown in FIG. 14 is touched after all originals are fed by the ADF, the continuous feeding operation of the ADF is ended. Even when a copy operation is performed by only one cycle of the feeding operation of the ADF, as usual, the continuous feeding operation can be ended by touching this end region after a predetermined number of originals are fed once, so that normal electronic sort processing is enabled.

The operation of the third embodiment will be described below with reference to the flow chart in FIG. 17.

A description of the same operations as those in the flow chart of the second embodiment shown in FIG. 16 will be omitted, and only different processing will be described below.

If the electronic sort mode is selected (ST54), the continuous mode is set. When a print key is depressed (S56), and originals are present on an ADF (S58), feeding of the originals and scanning of original images are repeated. Unless the end region 120 shown in FIG. 14 is touched (ST86), the ADF waits for setting of next originals (ST71). If the ADF becomes empty, and the end region is turned on (ST86), original input is completed (ST74). The page images are read out in a set order, so electronic sort printing is executed (ST76).

An example of saddle stitching (magazine binding) of a large number of originals by electronic sort printing shown in FIG. 18, which is enabled by the continuous mode of the present invention, will be described below. In FIG. 18, the capacity of the original tray is 100. For 200 originals, the feeding operation is performed twice. Conventionally, print processing is also independently performed. In the present invention, however, after all images are stored in the page memory, print processing is performed. Therefore, the original images of pages 1, 2, 199, and 200 can be formed on a first paper sheet 407; the original images of pages 3, 4, 197, and 198, on a second paper sheet 409; . . . , the original images of pages 97, 98, 103, and 104, on a 49th paper sheet 411; and the original images of pages 99, 100, 101, and 102, on a 50th paper sheet 413.

According to any one of the first, second, and third embodiments, the continuous mode of the present invention is selected, and after the ADF feeding operation is performed a plurality of number of times, electronic sort printing is enabled. However, the present invention is not limited to the above embodiments, and the same functions/effects as described above can be obtained following similar procedures, as a matter of course.

As has been described above, according to the present invention, an image forming apparatus which can process originals which are separately set a plurality of number of times as a series of originals can be provided. Even a large number of originals more than the capacity of the ADF can be separately set on the ADF a plurality of number of times. Therefore, originals more than the capacity of the ADF can be processed without posing any problem.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:

feeding means for feeding originals from an original tray to set the originals to a predetermined position where the originals are read;

setting means for setting a times number of using the feeding means to process a plurality of originals in one or more groups via an operational panel;

selecting means for selecting a continuous mode when said times number set by said setting means indicates that said plurality of originals is to be processed in two or more groups, each group separately set on the original tray and fed;

reading means for reading a plurality of images of the plurality of originals as each group of the plurality of originals is separately set on the original tray and fed by the feeding means in the continuous mode;

storing means for storing, as a series of images, the plurality of images read by the reading means, as each group of the plurality of originals is read by the reading means, while the continuous mode is selected by the selecting means; and forming means for forming the series of images stored in the storing means in a predetermined order.

2. An image forming apparatus, comprising:

feeding means for feeding originals from an original tray to set the originals to a predetermined position where the originals are read;

reading means for reading the originals fed by the feeding means;

selecting means for displaying an instruction region on a touch panel so as to permit selection of a continuous mode while the reading means reads originals, in the continuous mode groups of originals, which are separately set on the original tray and fed, are processed as a series of related originals;

storing means for storing, as a series of related images, a plurality of images read by the reading means as each group of originals is read by the reading means, while the continuous mode is selected by the selecting means; and forming means for forming the series of related images stored in the storing means in a predetermined order.

3. An image forming apparatus, comprising:

feeding means for feeding originals from an original tray to set the originals to a predetermined position where the originals are read;

selecting means for selecting a continuous mode, in the continuous mode groups of originals which are separately set on the original tray and fed, are processed as a series of related originals;

reading means for reading a plurality of images of the originals fed by the feeding means;

storing means for storing the plurality of images read by the reading means to a storage area as groups of originals are separately set on the original tray and fed, while the continuous mode is selected by the selecting means;

forming means for, when the storage area becomes full while the storing means stores the plurality of images in the continuous mode, interrupting reading and storing operations of the reading means and storing means and forming images corresponding to stored images which can be formed; and second reading and storing means for reading and storing images of other groups of said originals that are not stored yet into an area in which an image formed by the forming means was previously stored.

4. An image forming apparatus, comprising:

feeding means for feeding originals from an original tray to set the originals to a predetermined position where the originals are read;

selecting means for selecting a continuous mode, in the continuous mode groups of originals, which are separately set on the original tray and fed, are processed as a series of related originals;

reading means for reading a plurality of images of the originals fed by the feeding means;

storing means for storing, as a series of related images, the plurality of images read by the reading means as each group of originals is separately set on the original tray and fed, while the continuous mode is selected by the selecting means; and means for accessing the series of related images stored in the storing means in an order that is different from the reading order, corresponding to a format requested by an operator, and for forming images in a magazine binding format based on accessed images.

* * * * *